W. W. BRISBEN.
LAWN MOWER.
APPLICATION FILED DEC. 21, 1917.
1,293,321.
Patented Feb. 4, 1919.
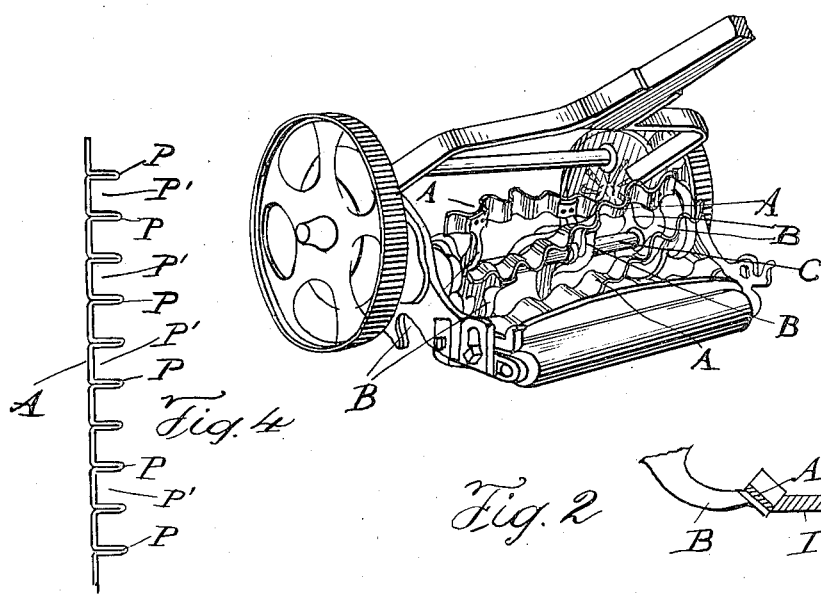
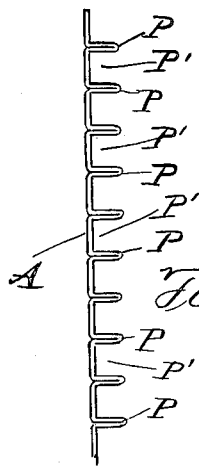
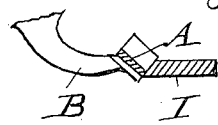
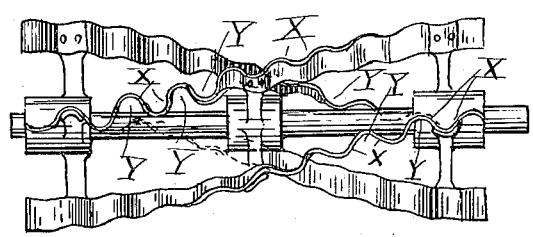
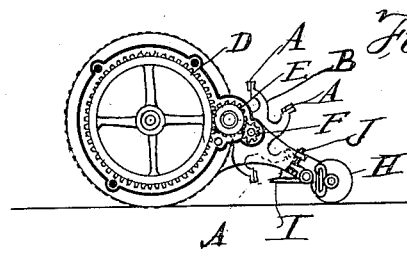
WITNESSES:
INVENTOR.
William W. Brisben
BY
ATTORNEYS.

UNITED STATES PATENT OFFICE.

WILLIAM W. BRISBEN, OF COATSVILLE, PENNSYLVANIA.

LAWN-MOWER.

1,293,321.  Specification of Letters Patent.  Patented Feb. 4, 1919.

Application filed December 21, 1917. Serial No. 208,307.

*To all whom it may concern:*

Be it known that I, WILLIAM W. BRISBEN, a citizen of the United States, and resident of Coatsville, in the county of Chester and State of Pennsylvania, have invented certain new and useful Improvements in Lawn-Mowers, of which I hereby declare the following to be a full, clear, and exact description, such as will enable others skilled in the art to which it appertains to make and use the same.

The objects of the invention are to provide an improved form of cutter for lawn mowers which is particularly adapted for cutting lawns closely as for the velvet lawns of golf links which require very close cropping and in which work extreme efficiency is required.

The improved form of cutter, provides a series of recesses in the blades which gather in and confine the blades of grass so that there can be no slip or uncertain action thereof.

The general forms of recesses may be varied to suit particular conditions of the vegetation to be cut, but the invention is characterized by a series of projecting portions alternating with recesses into which the grass stalks are gathered and are prevented therefrom by from slipping laterally so as to escape from the blade.

The invention is hereinafter more fully described, shown in the accompanying drawings and specifically pointed out in the claims.

In the accompanying drawings Figure 1 is a perspective view of a lawn mower supplied with corrugated cutter blades; Fig. 2 is a side elevation of the cutter blades; Fig. 3 is a transverse section showing the speed gearing therefor.

Fig. 4 is an edge view of a preferred form of blade, showing alternate projections and recesses formed by folding the blade upon itself;

Fig. 5 is a transverse section thereof.

In these views A, A, are the cutter blades supported upon spider arms B, B, B, and mounted upon a shaft C driven preferably by means of a train of speed producing gears D, E and F and adjusted by means of the adjustable roller at H. A bar I against which the cutter operates and adjustable at J permits perfect action of the blades. As shown in Figs. 1 and 2 the cutting blades are formed of corrugated steel bands, and which draws such material as is not immediately cut into the recesses Y Y and prevents its escape so that it is immediately severed.

This makes the cutter efficient where weed stems such as seed stems of the black plantain are found on the lawn and which are ordinarily skipped by the lawn mowers and greatly disfigure the lawn.

In Fig. 4 a modified form of blade is shown where the corrugations are found only on the outer side of the edge and at the rear side the metal is folded flat against itself. This would have a great advantage in cutting long grass where the folded edges will enter the grass and the grooved portion will gather in and sever stems.

Other modifications can be made without departing from the spirit of the invention. In Fig. 4 the plaited projections serve to form pockets P' which retain the material to be severed, and also reinforce the blade so that it will not easily become bent. It is also understood that the recesses or pockets extend transversely across the entire width of the blade so as to gather in and sever all vegetation over which the blade passes.

The corrugated or recessed blade is preferably bent in spiral form.

The blade formed by bending the metal band backward and forward, with spaces intervening the forward and backward bent portions, as shown in the figures, is more useful than the well known blades which are spirally attached to the reel of the mower.

The spiral blade produces a drawing cut which bends the grass to one side. The edge gathers the grass stems and prevents them from slipping to one side.

The folds will not cause clogging since the knife blade cuts them quickly, and it will operate on drier and stiffer stems than the spiral blade since they cannot escape. The knife blade must be solid and heavy enough to be rigid when it encounters the grass and stems.

Having described the invention what I claim as new and desire to secure by Letters Patent is—

1. A lawn mower comprising a reel, having a cutting blade, said blade bent alternately forward and backward with spaces intervening the forward and backward bent portions.

2. A lawn mower comprising a reel, having spaced cutting blades thereon, each blade bent alternately forward and backward, with spaces intervening the forward and backward bent positions.

3. A lawn mower comprising a reel, having spaced cutting blades thereon, each blade bent alternately backward and forward, with spaces intervening the forward and backward bent portions and means for supporting and rotating said reel.

In testimony whereof, I hereunto set my hand this day of September 11, 1917.

WILLIAM W. BRISBEN.

In presence of—
JOHN T. MCINTIRE,
ELIZABETH MCINTIRE.